Figure 12:
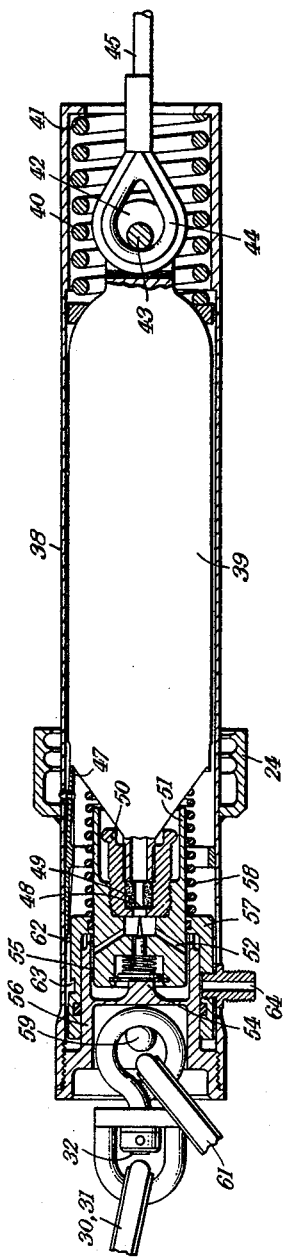

Dec. 21, 1965   A. J. DUNN ETAL   3,224,369
MISSILES AND OTHER AERIAL BODIES
Filed July 12, 1963   5 Sheets-Sheet 1
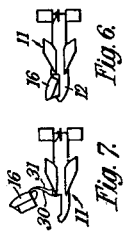
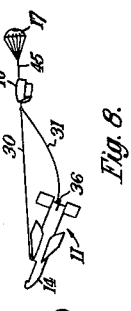
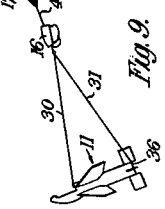
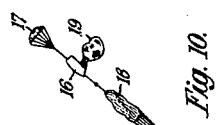
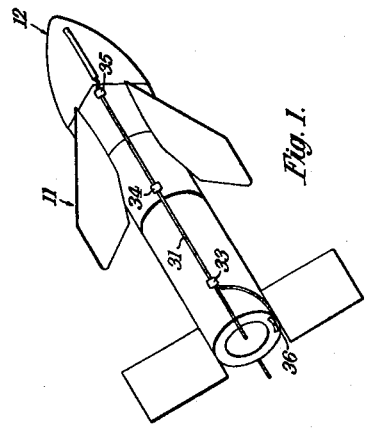
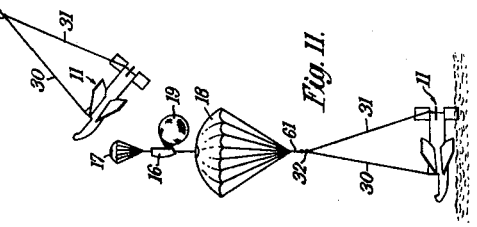

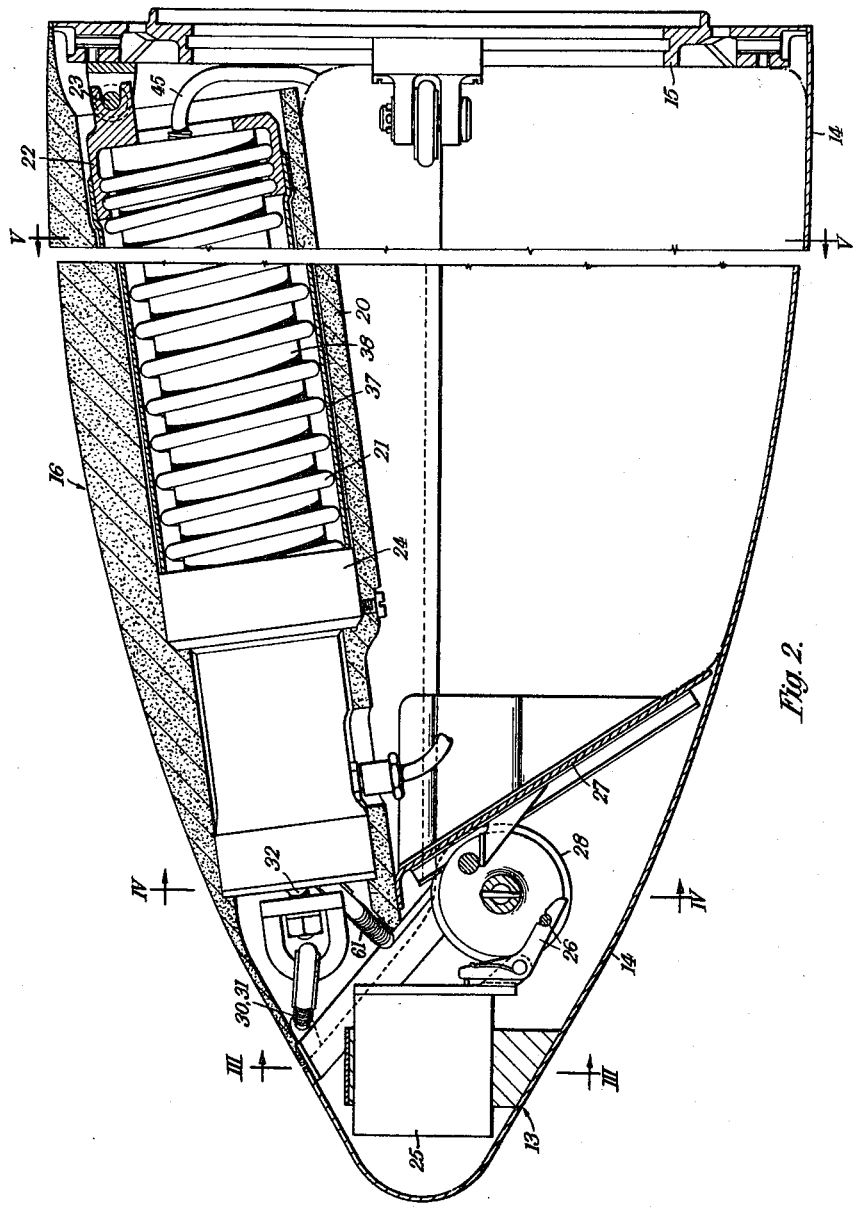

Dec. 21, 1965   A. J. DUNN ETAL   3,224,369
MISSILES AND OTHER AERIAL BODIES
Filed July 12, 1963   5 Sheets-Sheet 3
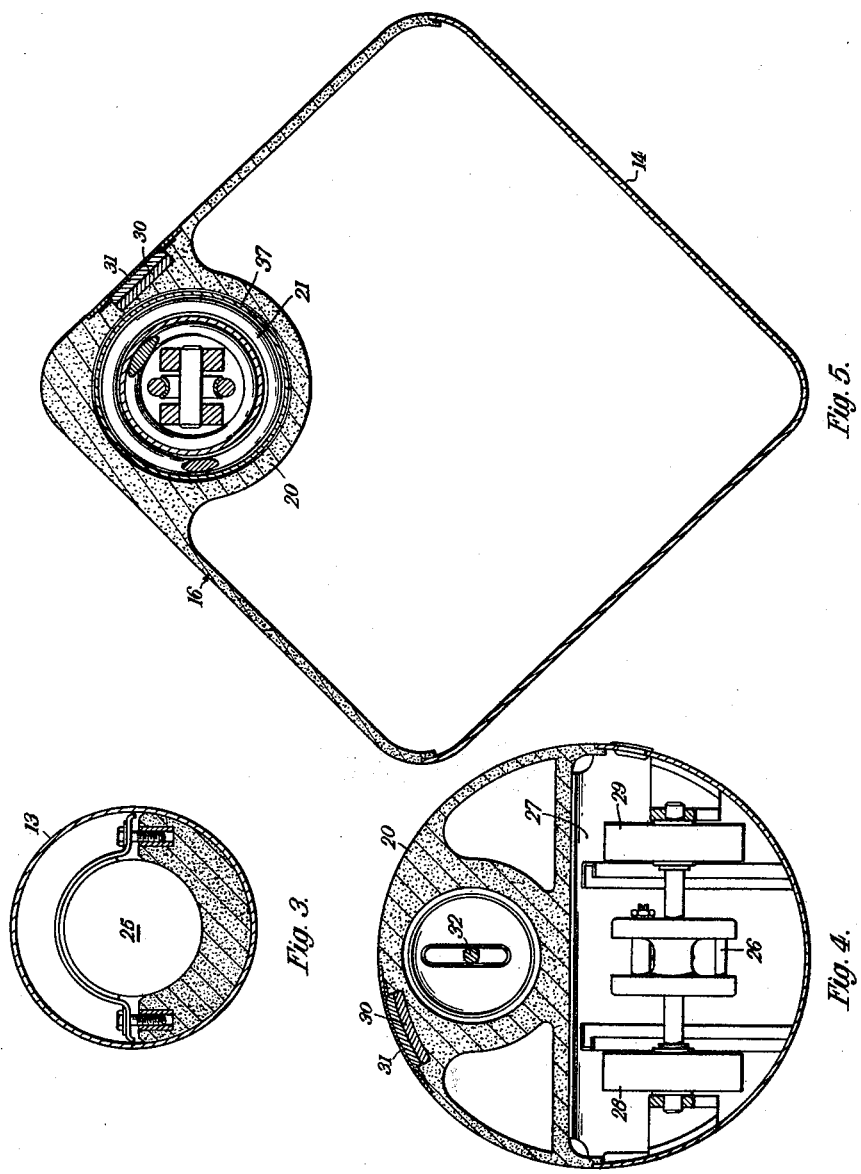

Dec. 21, 1965  A. J. DUNN ETAL  3,224,369
MISSILES AND OTHER AERIAL BODIES
Filed July 12, 1963  5 Sheets-Sheet 5

US United States Patent Office 3,224,369
Patented Dec. 21, 1965

3,224,369
MISSILES AND OTHER AERIAL BODIES
Albert John Dunn, Bangor, and Robert George Brown, Cregagh, Belfast, Northern Ireland, assignors to Short Brothers & Harland Limited, Belfast, Northern, Ireland, a British company
Filed July 12, 1963, Ser. No. 294,657
Claims priority, application Great Britain, July 23, 1962, 28,291/62
17 Claims. (Cl. 102—34.1)

The present invention relates to missiles and other aerial bodies and is particularly though not exclusively concerned with the recovery of missiles used for practice purposes.

In carrying out missile firing practice it has been customary to employ practice rounds which are dispensable. With the development of guided missiles, however, the complexity of the control apparatus embodied in the missile makes it highly desirable to recover at least some parts of the missile for re-use in the manufacture of further practice rounds.

In our co-pending application Serial No. 294,956, filed July 15, 1963, now abandoned, there is described a missile for practice purposes comprising a detachable recovery unit housing a parachute or like retarding device and in association therewith energy storage means which upon automatic release urges the unit to pivot about an axis fixed in relation to the missile so as to bring the unit into the slipstream of the missile in such a way that the drag on the unit assists the further pivoting of the unit about said pivot, the energy from said energy storage means acting to thrust the recovery unit clear of the missile to permit subsequent and unimpeded release of the parachute or like device from the unit.

The specific embodiment described in our co-pending application includes a pilot parachute which is arranged automatically to release from the unit upon ejection of the latter from the missile and it is an object of the present invention to utilise the pilot parachute to effect the automatic release of the main parachute from the unit when the speed of the missile has fallen to a predetermined level.

According to the present invention there is provided a release mechanism responsive to a reduction in the drag on a pilot parachute to release a main parachute, comprising a container filled with gas under pressure and slidably mounted in a housing, said container being adapted to be connected to the pilot parachute whereby drag on the latter causes the container to be displaced in the housing in one sense against the resistance of resilient means, said housing including latch means adapted to prevent the container from moving within the housing in the opposite sense beyond a predetermined limiting position under the action of the resilient means, and said latch means being adapted to move to an inoperative position upon an initial displacement of the container in said one sense by the drag on the pilot parachute whereby subsequent reduction of the drag results in the container moving in the said opposite sense under the action of the resilient means beyond the said limiting position so as to move the container into engagement with a piercing element which pierces the container and permits a flow of gas from the container to one side of a piston element slidably mounted within the housing to move said piston element from a locking position in which it holds a securing element for the main parachute to a release position in which it releases said element.

In a preferred arrangement according to the present invention, the gas from the container is simultaneously utilized to inflate a flotation bag but provision is made for initially restricting the flow of gas to the bag so that sufficient gas pressure may be developed to move the piston element to the release position. Further latch means are provided for cooperation with the piston element so that upon the latter reaching or moving beyond the release position the further latch means cooperate with the piston element and hold it in a position allowing substantially unimpeded flow of gas to the flotation bag.

Figure 13:
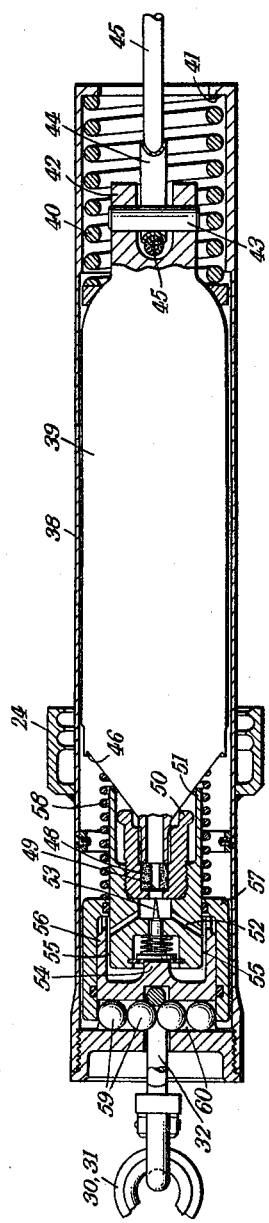
Figure 14:
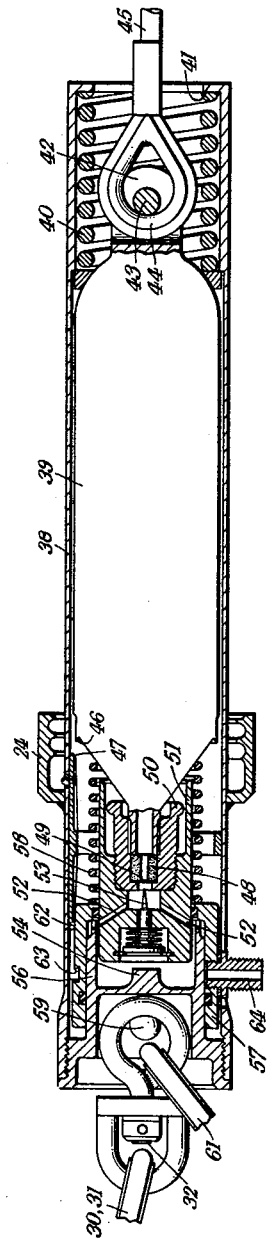
Figure 15:
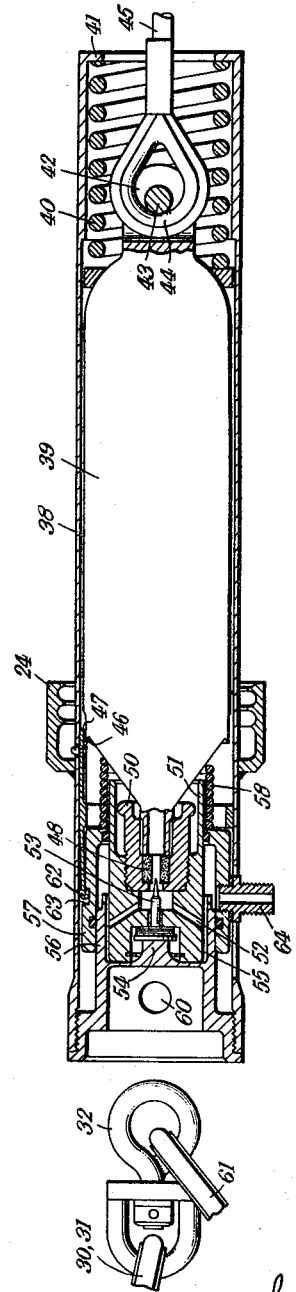

One embodiment of the invention will now be described by way of example with reference to the accompanying drawings in which, FIG. 1 is a schematic perspective view of a missile embodying a release mechanism according to the invention, FIG. 2 is a section of a recovery head forming part of the missile shown in FIG. 1, FIGS. 3, 4 and 5 are cross-sections of the head shown in FIG. 2 taken on the lines III—III, IV—IV and V—V, FIGS. 6 to 11 are schematic diagrams showing the missile at different stages during recovery, FIG. 12 is an enlarged side elevation of the release mechanism according to the invention, embodied in a detachable recovery unit of the recovery head shown in FIG. 2, FIG. 13 is a plan view of the mechanism shown in FIG. 12, FIG. 14 is a side elevation of the mechanism shown in FIG. 12, under loading by a pilot parachute, and FIG. 15 is a side elevation of the mechanism shown in FIG. 12, in a condition permitting release of a main parachute.

Referring to the drawings, FIG. 1 shows a conventional operational guided missile 11, the fuse and warhead sections of which are replaced by a detachable recovery head 12. The recovery head 12 is shown in detail in FIGS. 2, 3, 4 and 5 and comprises a forward nose portion 13 joined by a lower outer shell portion 14 to a back plate 15 adapted to be secured to the main body of the missile 11. The recovery head 12 is completed by a detachable recovery unit 16 occupying the space within the lower shell portion 14 and the space above it, and forming the upper part of the recovery head between the nose portion 13 and back plate 15. The actuating mechanism for the recovery unit 16 is housed in the upper part of the unit above the center line of the missile 11, and a pilot parachute or drogue 17 (FIG. 11), a main parachute 18 (FIG. 11) and a flotation bag 19 (FIG. 11), in their collapsed conditions, are stowed beneath and fit within the lower shell portion 14 of the recovery head 12.

In the upper part of the recovery unit 16 there is provided a housing 20 for a compression spring 21 which extends in a direction generally longitudinally of the missile. The spring 21 at one end is provided with an end cap 22 formed with a yoke which embraces a pivot pin 23 mounted on the front face of the back plate 15, and the forward end of the spring 21 terminates in a further cap 24 secured within the forward end of the upper part of the recovery unit 16. The nose portion 13 of the head 12 contains a time delay switch 25 which is set just prior to the missile being fired, and following a predetermined time delay after setting releases a locking device 26 securing the forward end of recovery unit 16. At the forward end, the recovery unit 16 is provided with an inclined guide plate 27 which is arranged to ride up on two spaced rollers 28, 29 mounted in the nose portion 13 of the head 12, when the recovery unit 16 is released.

In operation, when the forward end of the unit 16 is released by operation of the time delay switch 25, the force of the spring 21 acting on the unit 16 causes the latter to be urged forward so that the inclined plate 27 on the unit rides upon the rollers 28, 29. As the inclined plate 27 rides up on the rollers, the spring 21 expands and the unit 16 pivots about the pivot pin 23 on the back plate 15. The forward end of the unit 16 is then caught in the slipstream of the missile, which further assists in the turning of the unit 16 about the pivot pin 23. The spring 21 continues to expand and thrust the recovery unit 16 clear of the missile.

Flexible straps are provided between the recovery unit 16 and the main body of the missile 11 and in the preferred arrangement illustrated in FIG. 8 a single strap 30 extends from the back plate 15 of the recovery head 12 to the recovery unit 16 and another strap 31 extends from the rear of the missile 11 to the recovery unit 16. The pilot parachute 17 strapped beneath the unit 16 is automatically released upon ejection of the unit 16 and by means of an actuating mechanism now to be described effects the automatic release of the main parachute 18 from the unit 16 when the speed of the missile has fallen to a predetermined level.

Referring to FIGS. 12 and 13, an open-ended cylindrical housing 38 contains a cylindrical gas container 39 arranged as a sliding fit therein at intermediate positions therealong. A compression spring 40 extends between the rear end of the container 39 and an annular abutment 41 on the rear end of the housing. The rear end of the container 39 is provided with a yoke 42 and pin 43, which secures an eyelet 44 on the cord 45 of the pilot parachute 17 attached to the container. The forward end of the container 39 is formed with a peripheral end groove 46 which is engaged by the end of a resilient latch 47 to prevent the container 39 from moving forward in the housing 38 beyond a predetermined limiting position under the action of the compressed spring 40. The forward end of the container 39 is of conical form and is provided with an end nipple 48 terminating in a diaphragm 49 which in operation is perforated to permit the escape of gas from the container 39. The nipple 48 is embraced by an open ended inner cap 50 which is screwed on the nipple 48 and which in turn is embraced by an outer end cap 51 screwed on the inner cap 50 and formed with ports 52 for the distribution of gas to appropriate parts of the housing 38. The outer end cap 51 carries a perforating needle 53 which is normally spring-biased to a retracted position away from the diaphragm 49 and is arranged to be moved to a perforating position when the container 39 and associated end caps 50 and 51 are moved forward in the housing.

The mechanism so far described is used within a recovery unit 16 hereinbefore described and in operation the drag on the pilot parachute 17 causes the gas container 39 to move rearwardly in the housing and compress the rear-mounted compression spring 40. The resilient latch 47 releases from the peripheral groove 46 in the forward end of the container 39 and moves to a position to allow the container 39 to move forward in the housing beyond the limiting position as the drag on the pilot parachute 17 falls with reduction in the speed of the missile. As the drag on the pilot parachute 17 falls the container 39 moves forward bringing the perforating needle 53 in the end cap 51 to bear on a fixed spigot 54 in the housing 38 so that continued forward movement of the container 39 results in the perforation of the diaphragm 49. Gas from the container 39 passes through the radially extending ports 52 in the end cap 51 and into an annular channel 55 between the end cap 51 and a fixed skirt element 56 in the housing. The channel 55 communicates with the inside of a hollow piston 57 surrounding the skirt element 56 whereby gas from the channel 55 acts on the piston 57 causing it to move rearwardly in the housing 38 and compress a helical spring 58 mounted on the end cap 51 between the outer face of the piston 57 and the forward end of the container 39. In the undeflected position of the piston 57, the annular skirt thereof which extends forwardly in the housing 38 confines a set of retaining balls 59 within a diametrical channel 60 across the housing 38, holding them in contact with each other and preventing the swivel pin 32 through which the balls pass from being withdrawn from the housing 38. When the piston 57 moves under gas pressure rearwardly along the housing the retaining balls 59 are freed to an extent such as to permit the swivel pin 32 to pass between them. The swivel pin 32 is attached to the main parachute by a strap 61 and upon release effects the release of the latter.

A further resilient latch 62 is provided within the housing 38 for cooperation with the piston 57 so that when the latter is moved under gas pressure rearwardly in the housing to a limiting position, the further latch 62 engages in a recess 63 in the piston and holds it in that position so that subsequent reduction in gas pressure does no result in the return movement of the piston. The piston is provided with a radially extending outlet connection 64 in the skirt portion thereof, which leads to the flotation bag 19 and the arrangement is such that the piston 57 on moving to the limiting position brings the outlet connection into communication with the annular channel between the end cap 51 and the fixed skirt 56 in the housing whereby the pressurised gas from the container 39 is utilised to inflate the flotation bag 19.

The release mechanism described with reference to FIGS. 12 to 15 is housed within the recovery unit 16, the ejection spring 21 in the recovery unit 16 being mounted coaxially round the cylindrical housing 38 of the release mechanism.

Referring now to FIGS. 6 to 11, and particularly to FIG. 8, the two supporting straps 30 and 31 extending from the missile to the ejected unit 16 are connected to the releasable swivel pin 32 in the unit 16, which is held in the unit until the release mechanism hereinbefore described is operated. The pilot parachute 17 is deployed so as to retard the missile, and as the speed of the missile is reduced the drag on the pilot parachute 17 falls and the container 39, which has been pulled rearwardly by the pilot parachute, then moves forwardly in the housing 38 so that the piercing element 53 pierces the diaphragm 49. As a result gas flows into the annular channel behind the piston 57 causing the latter to move rearwardly so that said retaining balls 59 are no longer confined within the skirt portion of the piston and move apart permitting the release of the swivel pin 32. The main parachute 18 is thus released as shown in FIG. 10 and deployed so as to retard the descent of the missile as shown in FIG. 11. As the piston 57 moves rearwardly in the housing 38, the port 64 therein comes into communication with the annular channel to which gas is supplied from the container 39, and the flotation bag 19 is inflated as illustrated in FIG. 11.

It will be observed that (a) the main parachute is not deployed until the speed of the missile has been retarded to a safe value by the pilot parachute, the controlling force being the drag of the latter which is a function of the speed of the missile and (b) the flotation bag is inflated before the missile enters the sea, thereby ensuring that the missile and flotation bag do not sink to a depth where the water-pressure will damage the missile and prevent full inflation of the bag.

The strap 31 for supporting the rear of the missile 11 is, before release of the recovery unit 16, held by tear-off clips 33, 34 and 35 so as to extend from the recovery head 12 along the full length of the missile to a rear attachment point 36. The housing 20 for the ejection spring 21 is preferably a fibre glass moulding conforming to the shape of the upper part of the missile head and the ejection spring 21 is preferably enclosed within a metal tube 37 fixed to the rear end of the spring so that after full extension of the spring the containing tube 37 remains in telescopic engagement with the housing 20.

It will be observed that the complete recovery operation is entirely automatic and only mechanical devices are employed, the operating force for ejecting the unit 16 being supplied by the spring 21 assisted by the aerodynamic forces on the ejected unit. In the arrangement according to the present invention the recovery unit 16 is arranged to be ejected from the missile with the minimum of frictional resistance, and in such a way that it will not foul the wings or fins of the missile.

What we claim as our invention and desire to secure by Letters Patent is:

1. A missile or other aerial body comprising a detachable recovery unit, a main parachute and a pilot parachute housed in said recovery unit, ejection means responsive to a control signal to thrust the recovery unit clear of the missile, a releasable securing element in the recovery unit, flexible support means connected between the missile and the securing element, means conecting the main parachute between the releasable securing element and the recovery unit whereby upon release of the securing element the main parachute is deployed between the recovery unit and the missile, a release mechanism mounted on the recovery unit and connected to the pilot parachute, said release mechanism being responsive to a reduction in the drag on the pilot parachute to a predetermined value after deployment thereof to release said securing element to cause the main parachute to be deployed.

2. A missile according to claim 1, comprising a recovery head as a forwardmost section of the missile, said head incorporating said detachable recovery unit.

3. A missile according to claim 2, wherein the recovery head comprises a forward nose portion joined by a lower outer shell portion to a back plate secured to the main body of the missile, and wherein the detachable recovery unit occupies the space within the lower shell portion and the space above so as to form the missile head.

4. A missile according to claim 3, wherein the ejection means is housed in a housing of the recovery unit and the parachutes are stowed beneath the housing and fit within the lower shell portion of the recovery head.

5. A missile according to claim 4, wherein the ejection means comprises a compression spring.

6. A missile according to claim 5, wherein the compression spring is a coil spring extending in a direction generally longitudinally of the missile, the spring at one end engaging in an end member having a yoke which embraces a pivot pin mounted on the back plate, and wherein the other end of the spring is secured within the forward end of the recovery unit housing.

7. A missile according to claim 6, wherein the recovery unit housing is provided at its forward end with guide means arranged to guide the forward end of the housing forwardly and outwardly under the influence of the compression spring.

8. A missile acording to claim 1, wherein said release mechanism comprises a container filled with gas under pressure and slidably mounted in the housing of the recovery unit, resilient means biasing said container in one sense, means connecting said container to the pilot parachute whereby drag on the latter causes the container to be displaced in the housing in an opposite sense against the resistance of said resilient means, latch means on said housing to prevent the container from moving within the housing in the said one sense beyond a predetermined limiting position under the action of said resilient means, said latch means moving to an inoperative position upon an initial displacement of the container in said opposite sense by the drag on the pilot parachute whereby subsequent reduction of the drag results in the container moving in the said one sense under the action of the resilient means beyond the said limiting position, a piercing element positioned to pierce the container on said container moving beyond the said limiting position to permit a flow of gas from the container, a piston element slidably mounted within the housing and means directing said flow of gas to one side of said piston element to move said piston element from a locking position in which it holds the securing element for the main parachute to a release position in which it releases said securing element.

9. A missile according to claim 8, wherein said container is slidably mounted in the housing, one end of the container being connected to the pilot parachute and the other end being formed with a diaphragm which is adapted to be pierced by the cooperating piercing element when the container moves in the said opposite sense beyond the said limiting position.

10. A missile according to claim 9, wherein the end of the container carrying the diaphragm also carries said piercing element which is spring-loaded to a retracted position and which is arranged to strike a portion of the housing when the container is moved beyond the limiting position so that it is moved thereby against its spring loading into piercing engagement with the diaphragm.

11. A missile according to claim 10, wherein the container is a cylindrical container and wherein the diaphragm is mounted centrally in an end cap of the container and the spring-loaded piercing element is mounted in an outer cap embracing the inner cap.

12. A missile according to claim 11, wherein the piston element is in the form of a cylindrical hollow piston mounted for sliding movement on the outer cap and wherein gas from the container passes through one or more ducts in the outer cap into an annular channel formed bewteen the piston and the outer cap so that the piston is moved to the release position by the flow of gas into the annular channel.

13. A missile according to claim 8, wherein said release mechanism includes a set of retaining balls and wherein said securing element is prevented from disengaging from the housing by said balls which are held in contact with each other in a channel in the housing by the piston element when the latter is in the locking position, and wherein the piston element on moving to the release position permits the balls to separate to such an extent that the securing element can pass between them and move free of the housing.

14. A missile according to claim 8 including a flotation bag connected to the recovery unit, and means to direct gas from the container to inflate a flotation bag.

15. A missile according to claim 14, including means to initially restrict the flow of gas to the bag to provide the development of sufficient gas pressure to move the piston element to the release position.

16. A missile according to claim 15, wherein the restricting means comprises a port in said piston element for supplying gas to the bag, the port being shut off from the supply until the piston element moves to the release position.

17. A missile according to claim 16, comprising further latch means for cooperation with the piston element so that upon the latter reaching or moving beyond the release position the further latch means cooperates with the piston element and holds it in a position allowing a substantially unimpeded flow of gas to the flotation bag.

References Cited by the Examiner
UNITED STATES PATENTS

| | | | |
|---|---|---|---|
| 1,691,709 | 11/1928 | Eller et al. | 244—139 |
| 2,218,931 | 10/1940 | Carlson | 222—5 |
| 2,271,224 | 1/1942 | Goddard | 244—139 |
| 2,717,100 | 9/1955 | Engelder | 255—5 |
| 2,796,284 | 6/1957 | Bensow et al. | 294—83.1 |
| 2,843,416 | 7/1958 | Warren | 294—83.1 |
| 2,928,693 | 3/1960 | Cannon | 294—83.1 |
| 2,942,911 | 6/1960 | Stott | 294—83.1 |
| 3,097,819 | 7/1963 | Raistakka | 244—139 |

BENJAMIN A. BORCHELT, *Primary Examiner.*

SAMUEL FEINBERG, *Examiner.*

R. F. STAHL, *Assistant Examiner.*